June 22, 1926.
J. J. HILL
1,590,093
LOADING RIGGING
Filed Nov. 28, 1925
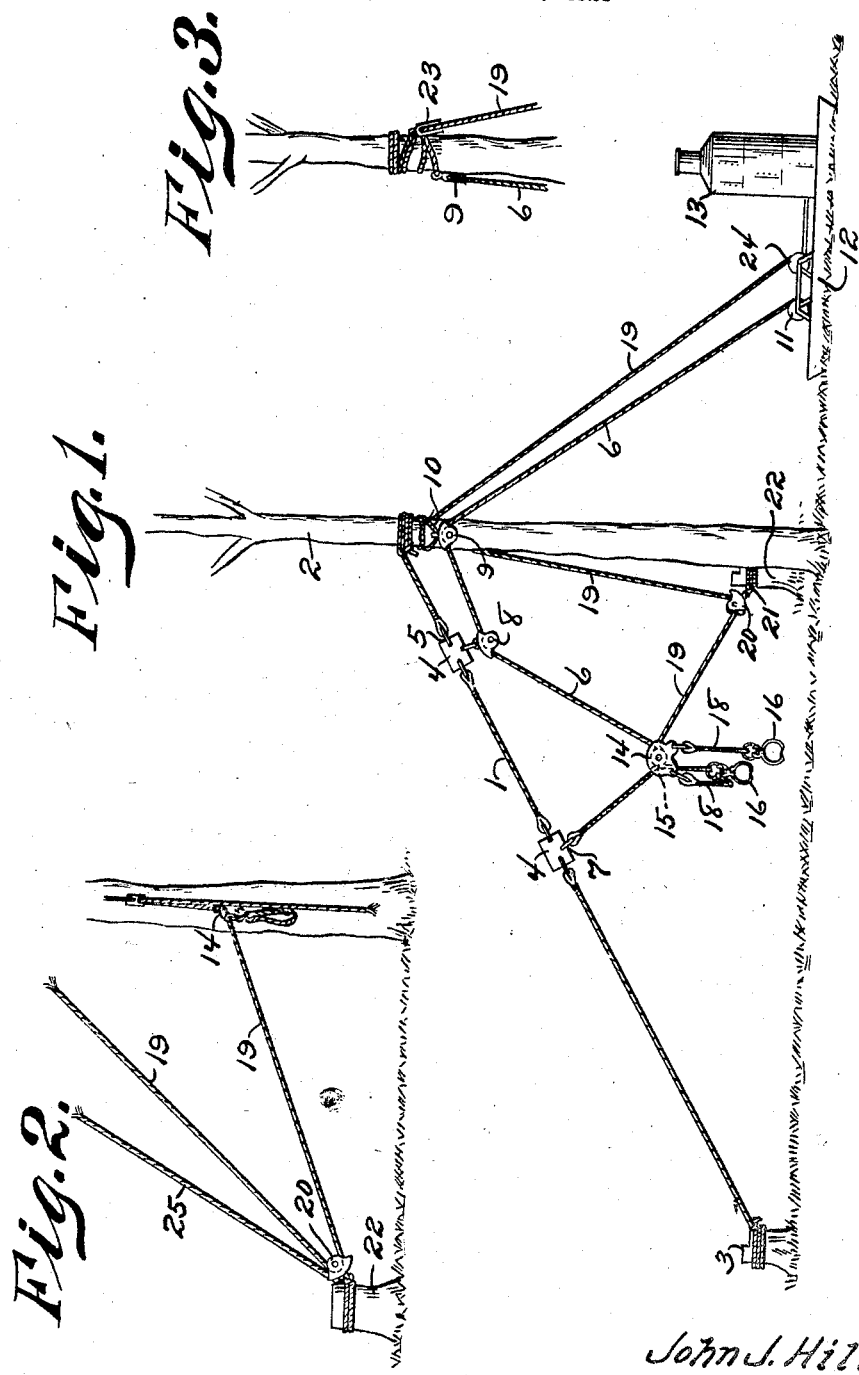
John J. Hill
INVENTOR
BY Victor J. Evans
ATTORNEY
WITNESS:

Patented June 22, 1926.

1,590,093

UNITED STATES PATENT OFFICE.

JOHN J. HILL, OF SEATTLE, WASHINGTON.

LOADING RIGGING.

Application filed November 28, 1925. Serial No. 72,010.

This invention relates to a rigging for handling logs in the woods, the general object of the invention being to provide means whereby the logs can be pulled to a position adjacent the wagon or truck and then raised and placed in the truck by the one rigging.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view of the rigging attached to a tree and to stumps.

Figure 2 is a view taken at right angles to Figure 1.

Figure 3 is a view showing how the pair of pulleys is attached to the tree.

In carrying out my invention, I provide a jack line 1 which is connected to a tree 2 and a stump 3, the jack line being formed in three pieces with the center piece connected with the end pieces by the plates 4. Shackles 5 are provided for connecting the ends of the pieces to the plates. A load line 6 has one end connected by a shackle 7 to the lower plate 4, and said line passes over a pulley 8 carried by the other plate 4 and over a pulley 9 which is fastened to the tree 2 by the cable 10 and has its other end fastened to a drum 11 on the support 12 of a donkey or other engine 13. A block 14 has its sheave 15 engaged by the line 6, so that the block is suspended from that part of the line between the block 4 and the pulley 8. Tongs or grapples 16 are connected by the short lengths of cables 18 to the block 14 and a hold-back line 19 passes over a sheave or pulley in block 14 and has one end connected with one of the tongs 16. This line 19 then passes over a pulley 20 which is attached by the cable 21 to a stump 22 which is located at one side of the tree and then the rope passes upwardly over a pulley 23 which is fastened to the tree opposite the pulley 9 and the other end of the rope 19 is fastened to a second drum 24 on the support 12. If desired, the pulley 20 can be attached to the guy rope 25 which is fastened to the stump 22 and the tree.

In using my improved rigging, the tongs 16 to which the line 19 is connected, are fastened to the log and then the drum 24 is rotated to wind the line 19 thereon, while the line 6 is slackened. This will pull the log over to the road or to a point adjacent the wagon or truck. Then the line 19 is slackened and the other tongs placed in engagement with the log after which the drum 11 is rotated to take up the slack of line 6 which will lift the block 14 and thus raise the log so they can be placed on the truck.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A rigging of the class described, comprising a jack line, supporting means for the same, a load line connected at one end to the jack line, a pulley on the jack line over which the load line passes to form a loop, a block having its sheave receiving the looped part of the load line, an elevated pulley over which the load line passes, a hold-back line passing over a pulley in the block, tongs connected with the hold-back line, a second pair of tongs, a flexible member connecting the second pair of tongs with the block, a pulley over which the hold-back line passes, means for supporting the same to one side of the jack line supporting means, an elevated pulley for the hold-back line, winding means for the hold-back line and winding means for the load line.

In testimony whereof I affix my signature.

JOHN J. HILL.